US011457338B2

(12) United States Patent
Cheng et al.

(10) Patent No.: US 11,457,338 B2
(45) Date of Patent: *Sep. 27, 2022

(54) ENHANCED VEHICLE-TO-EVERYTHING RADIO ACCESS TECHNOLOGY MIGRATION

(71) Applicant: QUALCOMM Incorporated, San Diego, CA (US)

(72) Inventors: Hong Cheng, Bridgewater, NJ (US); Michaela Vanderveen, Tracy, CA (US); Sudhir Kumar Baghel, Hillsborough, NJ (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/876,918

(22) Filed: May 18, 2020

(65) Prior Publication Data

US 2020/0280828 A1    Sep. 3, 2020

Related U.S. Application Data

(63) Continuation of application No. 16/006,124, filed on Jun. 12, 2018, now Pat. No. 10,659,936.

(Continued)

(51) Int. Cl.
*H04W 4/40* (2018.01)
*H04W 4/44* (2018.01)
(Continued)

(52) U.S. Cl.
CPC ............. *H04W 4/40* (2018.02); *H04L 69/18* (2013.01); *H04L 69/24* (2013.01); *H04L 69/321* (2013.01);
(Continued)

(58) Field of Classification Search
CPC .......... H04W 4/40; H04W 4/46; H04W 4/44; H04L 69/18; H04L 69/24
See application file for complete search history.

(56) References Cited

U.S. PATENT DOCUMENTS 10,659,936 B2 *   5/2020   Cheng ..................... H04W 4/44
2016/0295624 A1  10/2016   Novlan et al.
2019/0116475 A1   4/2019   Lee et al.

FOREIGN PATENT DOCUMENTS

CN         106559337 A      4/2017
WO     WO-2016159712 A1   10/2016

OTHER PUBLICATIONS

Ericsson: "V2X Communication Over LTE-Uu", C1-164893, 3GPP TSG-CT WG1 Meeting #101, Reno, NV (USA), Nov. 14-18, 2016, pp. 1-5.

(Continued)

*Primary Examiner* — Siming Liu
(74) *Attorney, Agent, or Firm* — Liem T. Do

(57) ABSTRACT

Methods, systems, and devices for wireless communication are described. A user equipment (UE) that is configured to transmit a message to a neighboring UE via multiple formats, identify a service parameter indicative of a format to be used for the message. The UE may convey information indicating the service parameter from a first layer of the UE to a second layer of the UE, wherein the first layer is an upper layer with respect to the second layer. The UE may generate, by the second layer and based at least in part on the information, the message in the format for communicating with the neighboring UE. Other aspects, embodiments, and features are claimed and described.

31 Claims, 11 Drawing Sheets

Related U.S. Application Data

(60) Provisional application No. 62/524,371, filed on Jun. 23, 2017.

(51) Int. Cl.
   | | |
   |---|---|
   | *H04W 48/18* | (2009.01) |
   | *H04L 69/18* | (2022.01) |
   | *H04W 4/46* | (2018.01) |
   | *H04L 69/24* | (2022.01) |
   | *H04L 69/321* | (2022.01) |

(52) U.S. Cl.
   CPC ............... *H04W 4/44* (2018.02); *H04W 4/46* (2018.02); *H04W 48/18* (2013.01)

(56) References Cited

OTHER PUBLICATIONS

Intel Corporation: "FS_eV2X Out of RAT Coverage", S1-162352 (revision of S1-162116), 3GPP TSG-SA WG1 Meeting #75, San Francisco, USA, Aug. 22-26, 2016, 2 pages.

QUALCOMM Incorporated: "Key Issues for Support of Extended Sensors", S2-174489 (was S2-17xxxx), SA WG2 Meeting #122, Jun. 26-30, 2017, San Jose Del Cabo, Mexico, pp. 1-2.

QUALCOMM Incorporated: "Open Issues and Resolutions for PC5 Based V2X", S2-161593 (was S2-16xxxx), SA WG2 Meeting #114, Sophia Antipolis, France, Apr. 11-16, 2016, 6 pages.

3rd Generation Partnership Project; Technical Specification Group Services and System Aspects; Architecture enhancements for V2X Services (Release 14), 3GPP Draft; 23285-E30_CRS_IMPLEMENTED, 3rd Generation Partnership Project (3GPP), Mobile Competence Centre; 650, Route Des Lucioles; F-06921 Sophia-Antipolis Cedex; France, Jun. 12, 2017, XP051334826, Retrieved from the Internet: URL:http://www.3gpp.org/ftp/tsg_sa/WG2_Arch/Latest_SA2_Specs/DRAFT_INTERIM/Archive/ [retrieved on Jun. 12, 2017], 35 pages.

Intel Corporation: "FS_eV2X RAT Selection based on KPIs", 3GPP Draft; S1-162355 Was S1-162115 EV2X Rat Selection, 3rd Generation Partnership Project (3GPP), Mobile Competence Centre; 650, Route Des Lucioles; F-06921 Sophia-Antipolis Cedex; France, vol. SA WG1, No. San Francisco, USA; Aug. 22, 2016-Aug. 26, 2016 Aug. 24, 2016, XP051130248, Retrieved from the Internet: URL: https://www.3gpp.org/DynaReport/TDocExMtg--S1-75--31724.htm [retrieved on Aug. 24, 2016], 1 page.

International Search Report and Written Opinion—PCT/US2018/037223—ISA/EPO—Aug. 20, 2018.

QUALCOMM Incorporated: "Coexistence between Rel-14 and Rel-15 V2X UEs", 3GPP Draft; R2-1713407_Co-Existing REL-14 and REL-15 V2X UES, 3rd Generation Partnership Project (3GPP), Mobile Competence Centre; 650, Route Des Lucioles; F-06921 Sophia-Antipolis Cedex; France, vol. RAN WG2, No. Reno, USA; Nov. 27, 2017-Dec. 1, 2017 Nov. 17, 2017, XP051372141, Retrieved from the Internet: URL:http://www.3gpp.org/tsg_ran/WG2_RL2/TSGR2 100/Docs/R2-1713407_Co-existing Rel-14 and Rel-15 V2X UEs .doc (and) URL: http://www.3gpp.org/ftp/tsg%5Fran/WG2%5FRL2/TSGR2%5F100/Docs/ [retrieved on Nov. 17, 2017], 3 pages.

ZTE Corporation: "Discussion on Rel-14 and Rel-15 V2X Coexistence Issues", 3GPP Draft; R2-1801963, 3rd Generation Partnership Project (3GPP), Mobile Competence Centre; 650, Route Des Lucioles; F-06921 Sophia-Antipolis Cedex; France, vol. RAN WG2, No. Athens, Greece; Feb. 26, 2018-Mar. 2, 2018 Feb. 14, 2018, XP051399055, Retrieved from the Internet: URL:http://www.3gpp.org/tsg_ran/WG2_RL2/TSGR2_101/Docs/R2-1801963.doc (and) URL: http://www.3gpp.org/ftp/tsg%5Fran/WG2%5FRL2/TSGR2%5F101/Docs/ (retrieved on Feb. 14, 2018], 4 pages.

* cited by examiner

ENHANCED VEHICLE-TO-EVERYTHING RADIO ACCESS TECHNOLOGY MIGRATION

CROSS REFERENCES

The present application for patent is a Continuation of U.S. patent application Ser. No. 16/006,124 by Cheng et al., entitled "Enhanced Vehicle-To-Everything Radio Access Technology Migration" filed Jun. 12, 2018, which claims priority to and the benefit of U.S. Provisional Patent Application No. 62/524,371 by Cheng, et al., entitled "Enhanced Vehicle-To-Everything Radio Access Technology Migration," filed Jun. 23, 2017, each of which is assigned to the assignee hereof and incorporated by reference herein for all applicable purposes.

TECHNICAL FIELD

The technology discussed below relates generally to wireless communication, and more specifically to enhanced vehicle-to-everything (eV2X) radio access technology (RAT) migration. Techniques and embodiments can enable and provide communication devices, methods, and systems for evolving network systems for interworking between and migration of varied networking systems (e.g. use of virtual bearers can aid in co-existence scenarios).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Wireless communication systems may include or support networks used for vehicle based communications, also referred to as vehicle-to-everything (V2X), eV2X, vehicle-to-vehicle (V2V) networks, cellular V2X (C-V2X) networks, or other similar networks. Vehicle based communication networks may provide always-on telematics where UEs, e.g., vehicle UEs (v-UEs), communicate directly to the network (V2N), to pedestrian UEs (V2P), to infrastructure devices (V2I), and to other v-UEs (e.g., via the network and/or directly). The vehicle based communication networks may support a safe, always-connected driving experience by providing intelligent connectivity where traffic signal/timing, real-time traffic and routing, safety alerts to pedestrians/bicyclist, collision avoidance information, etc., are exchanged.

Wireless communication systems may evolve such that different formats, protocols, RATs, and the like, change over time. Thus, wireless communication systems may be heterogeneous in that some devices may be configured for legacy operations and other devices may be configured for advanced operations. Coexistence of such devices within the same wireless communication system, e.g., a V2X based wireless communication system, may require migration and internetworking protocols.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

A method of wireless communication is described. The method may include identifying, at a UE that is configured to transmit a message to a neighboring UE via multiple formats, a service parameter indicative of a format to be used for the message, conveying information indicating the service parameter from a first layer of the UE to a second layer of the UE, wherein the first layer is an upper layer with respect to the second layer, and generating, by the second layer and based at least in part on the information, the message in the format for communicating with the neighboring UE.

An apparatus for wireless communication is described. The apparatus may include means for identifying, at a UE that is configured to transmit a message to a neighboring UE via multiple formats, a service parameter indicative of a format to be used for the message, means for conveying information indicating the service parameter from a first layer of the UE to a second layer of the UE, wherein the first layer is an upper layer with respect to the second layer, and means for generating, by the second layer and based at least in part on the information, the message in the format for communicating with the neighboring UE.

Another apparatus for wireless communication is described. The apparatus may include a processor, memory in electronic communication with the processor, and instructions stored in the memory. The instructions may be operable to cause the processor to identify, at a UE that is configured to transmit a message to a neighboring UE via multiple formats, a service parameter indicative of a format to be used for the message, convey information indicating the service parameter from a first layer of the UE to a second layer of the UE, wherein the first layer is an upper layer with respect to the second layer, and generate, by the second layer and based at least in part on the information, the message in the format for communicating with the neighboring UE.

A non-transitory computer readable medium for wireless communication is described. The non-transitory computer-readable medium may include instructions operable to cause a processor to identify, at a UE that is configured to transmit a message to a neighboring UE via multiple formats, a service parameter indicative of a format to be used for the message, convey information indicating the service parameter from a first layer of the UE to a second layer of the UE, wherein the first layer is an upper layer with respect to the second layer, and generate, by the second layer and based at least in part on the information, the message in the format for communicating with the neighboring UE.

Some examples of the method, apparatus, and non-transitory computer-readable medium described above may further include processes, features, means, or instructions for transmitting the configured message to the neighboring UE according to the format.

In some examples of the method, apparatus, and non-transitory computer-readable medium described above, the message may be associated with a service, and wherein identifying the service parameter comprises: selecting a service identifier associated with the service.

In some examples of the method, apparatus, and non-transitory computer-readable medium described above, the service comprises a cooperative adaptive cruise control service, a platooning operation service, or a sensor sharing service.

Some examples of the method, apparatus, and non-transitory computer-readable medium described above may further include processes, features, means, or instructions for including in the message, and by the first layer, a flag to indicate the service parameter.

In some examples of the method, apparatus, and non-transitory computer-readable medium described above, including the flag comprises: determining whether to include the flag in the message based at least in part on a listing of service identifiers associated with the format.

Some examples of the method, apparatus, and non-transitory computer-readable medium described above may further include processes, features, means, or instructions for classifying the message based at least on the service parameter.

In some examples of the method, apparatus, and non-transitory computer-readable medium described above, generating the message comprises: generating the message as a version of multiple versions of V2X messages.

In some examples of the method, apparatus, and non-transitory computer-readable medium described above, the communicating with the neighboring UE comprise communicating a safety message associated with vehicle-based operations.

A method of wireless communication is described. The method may include selecting, at a UE that is configured to transmit a message to a neighboring UE via multiple protocols, one or more parameters indicative of a RAT to be used for the message, conveying information indicating the one or more parameters from a first layer of the UE to a second layer of the UE, wherein the first layer is an upper layer with respect to the second layer, and instantiating, by the second layer and based at least in part on the parameter, a channel for communications with the neighboring UE according to the RAT.

An apparatus for wireless communication is described. The apparatus may include means for selecting, at a UE that is configured to transmit a message to a neighboring UE via multiple protocols, one or more parameters indicative of a RAT to be used for the message, means for conveying information indicating the one or more parameters from a first layer of the UE to a second layer of the UE, wherein the first layer is an upper layer with respect to the second layer, and means for instantiating, by the second layer and based at least in part on the parameter, a channel for communications with the neighboring UE according to the RAT.

Another apparatus for wireless communication is described. The apparatus may include a processor, memory in electronic communication with the processor, and instructions stored in the memory. The instructions may be operable to cause the processor to select, at a UE that is configured to transmit a message to a neighboring UE via multiple protocols, one or more parameters indicative of a RAT to be used for the message, convey information indicating the one or more parameters from a first layer of the UE to a second layer of the UE, wherein the first layer is an upper layer with respect to the second layer, and instantiate, by the second layer and based at least in part on the parameter, a channel for communications with the neighboring UE according to the RAT.

A non-transitory computer readable medium for wireless communication is described. The non-transitory computer-readable medium may include instructions operable to cause a processor to select, at a UE that is configured to transmit a message to a neighboring UE via multiple protocols, one or more parameters indicative of a RAT to be used for the message, convey information indicating the one or more parameters from a first layer of the UE to a second layer of the UE, wherein the first layer is an upper layer with respect to the second layer, and instantiate, by the second layer and based at least in part on the parameter, a channel for communications with the neighboring UE according to the RAT.

Some examples of the method, apparatus, and non-transitory computer-readable medium described above may further include processes, features, means, or instructions for identifying, by the first layer, one or more of a quality of service (QoS) metric, a proximity service (ProSe) per-packet priority (PPPP), a service identifier, or an identifier associated with the layer two identifier (L2ID), associated with the communications with the neighboring UE, wherein the parameter comprises one or more of the QoS metric, the PPPP, the service identifier, or the L2ID.

Some examples of the method, apparatus, and non-transitory computer-readable medium described above may further include processes, features, means, or instructions for configuring, for each packet of a one or more packets, the packet to indicate one or more of the QoS metric, the PPPP, the service identifier, or the L2ID, to the second layer.

In some examples of the method, apparatus, and non-transitory computer-readable medium described above, the QoS metric may be associated with a V2X quality indicator/identifier (VQI).

Some examples of the method, apparatus, and non-transitory computer-readable medium described above may further include processes, features, means, or instructions for configuring, by the second layer and according to the parameter, a virtual bearer to use for communications with the UE.

In some examples of the method, apparatus, and non-transitory computer-readable medium described above, the virtual bearer comprises one or more aspects of a logical bearer or a radio bearer.

In some examples of the method, apparatus, and non-transitory computer-readable medium described above, the virtual bearer comprises at least one of a long term evolution (LTE) V2X bearer and a set of next generation NR bearers.

In some examples of the method, apparatus, and non-transitory computer-readable medium described above, the set of NR bearers may be generated dynamically by the second layer based on the parameters selected by the first layer.

In some examples of the method, apparatus, and non-transitory computer-readable medium described above, the virtual bearer may be configured based on a message received from the neighboring UE.

In some examples of the method, apparatus, and non-transitory computer-readable medium described above, the receipt of the message triggers the activation of an application associated with the virtual bearer.

In some examples of the method, apparatus, and non-transitory computer-readable medium described above, the communication according to the RAT comprises one or more of a supported broadcast traffic function, a safety message function, a scheduling assignment, a carrier aggregation, a modulation and coding scheme (MCS), or a transmission time interval.

In some examples of the method, apparatus, and non-transitory computer-readable medium described above, the communications with the neighboring UE comprise communicating a message associated with vehicle-based operations.

Some examples of the method, apparatus, and non-transitory computer-readable medium described above may further include processes, features, means, or instructions for accessing, by the first layer, a preconfigured rule, a rule received from a network entity, or combinations thereof to select the one or more parameters.

Some examples of the method, apparatus, and non-transitory computer-readable medium described above may further include processes, features, means, or instructions for instantiating a LTE channel for communications with the neighboring UE by default. Some examples of the method, apparatus, and non-transitory computer-readable medium described above may further include processes, features, means, or instructions for setting up a next generation NR channel dynamically based at least in part on receiving a message from the neighboring UE triggering the generation of the NR channel.

A method of wireless communication is described. The method may include determining that the UE supports communicating using a first format and a second format, the first format being a legacy format with respect to the second format, receiving one or more messages from one or more neighboring UEs, determining, based at least in part on the one or more messages, that the one or more neighboring UEs support communications using the second format, and selecting the second format for communications with the one or more neighboring UEs.

An apparatus for wireless communication is described. The apparatus may include means for determining that the UE supports communicating using a first format and a second format, the first format being a legacy format with respect to the second format, means for receiving one or more messages from one or more neighboring UEs, means for determining, based at least in part on the one or more messages, that the one or more neighboring UEs support communications using the second format, and means for selecting the second format for communications with the one or more neighboring UEs.

Another apparatus for wireless communication is described. The apparatus may include a processor, memory in electronic communication with the processor, and instructions stored in the memory. The instructions may be operable to cause the processor to determine that the UE supports communicating using a first format and a second format, the first format being a legacy format with respect to the second format, receive one or more messages from one or more neighboring UEs, determine, based at least in part on the one or more messages, that the one or more neighboring UEs support communications using the second format, and select the second format for communications with the one or more neighboring UEs.

A non-transitory computer readable medium for wireless communication is described. The non-transitory computer-readable medium may include instructions operable to cause a processor to determine that the UE supports communicating using a first format and a second format, the first format being a legacy format with respect to the second format, receive one or more messages from one or more neighboring UEs, determine, based at least in part on the one or more messages, that the one or more neighboring UEs support communications using the second format, and select the second format for communications with the one or more neighboring UEs.

Some examples of the method, apparatus, and non-transitory computer-readable medium described above may further include processes, features, means, or instructions for decoding, for each received message, a scheduling assignment to determine that the UE support communications using the second format.

Some examples of the method, apparatus, and non-transitory computer-readable medium described above may further include processes, features, means, or instructions for decoding, for each received message, a header portion of the message to determine that the UE support communications using the second format.

In some examples of the method, apparatus, and non-transitory computer-readable medium described above, the header portion of the message comprises a medium access control (MAC) header portion, a radio link control (RLC) header portion, or a packet data convergence protocol (PDCP) header portion.

In some examples of the method, apparatus, and non-transitory computer-readable medium described above, the one or more messages may be associated with safety messages configured according to the first format.

In some examples of the method, apparatus, and non-transitory computer-readable medium described above, the one or more messages comprise a service identifier, wherein the service identifier conveys an indication that the UE supports communications using the second format.

In some examples of the method, apparatus, and non-transitory computer-readable medium described above, the second format comprises a radio access network (RAN) Release 15 or a RAN Release 16 format and the first format comprises a RAN Release 14 format.

Some examples of the method, apparatus, and non-transitory computer-readable medium described above may further include processes, features, means, or instructions for instantiating a LTE channel for communications with the neighboring UE by default. Some examples of the method, apparatus, and non-transitory computer-readable medium described above may further include processes, features, means, or instructions for setting up a next generation NR channel dynamically based at least in part on receiving a message from the neighboring UE triggering the generation of the NR channel.

Other aspects, features, and embodiments of the technology will become apparent to those of ordinary skill in the art, upon reviewing the following description of specific, exemplary embodiments in conjunction with the accompanying figures. While features of the technology discussed below may be described relative to certain embodiments and figures below, all embodiments can include one or more of the advantageous features discussed. While one or more embodiments may be discussed as having certain advantageous features, one or more of such features may also be used in accordance with the various embodiments discussed. In similar fashion, while exemplary embodiments may be discussed below as device, system, or method embodiments it should be understood that such exemplary embodiments can be implemented in varying shapes, sizes, layouts, arrangements, circuits, devices, systems, and methods.

DETAILED DESCRIPTION

Figure 1:
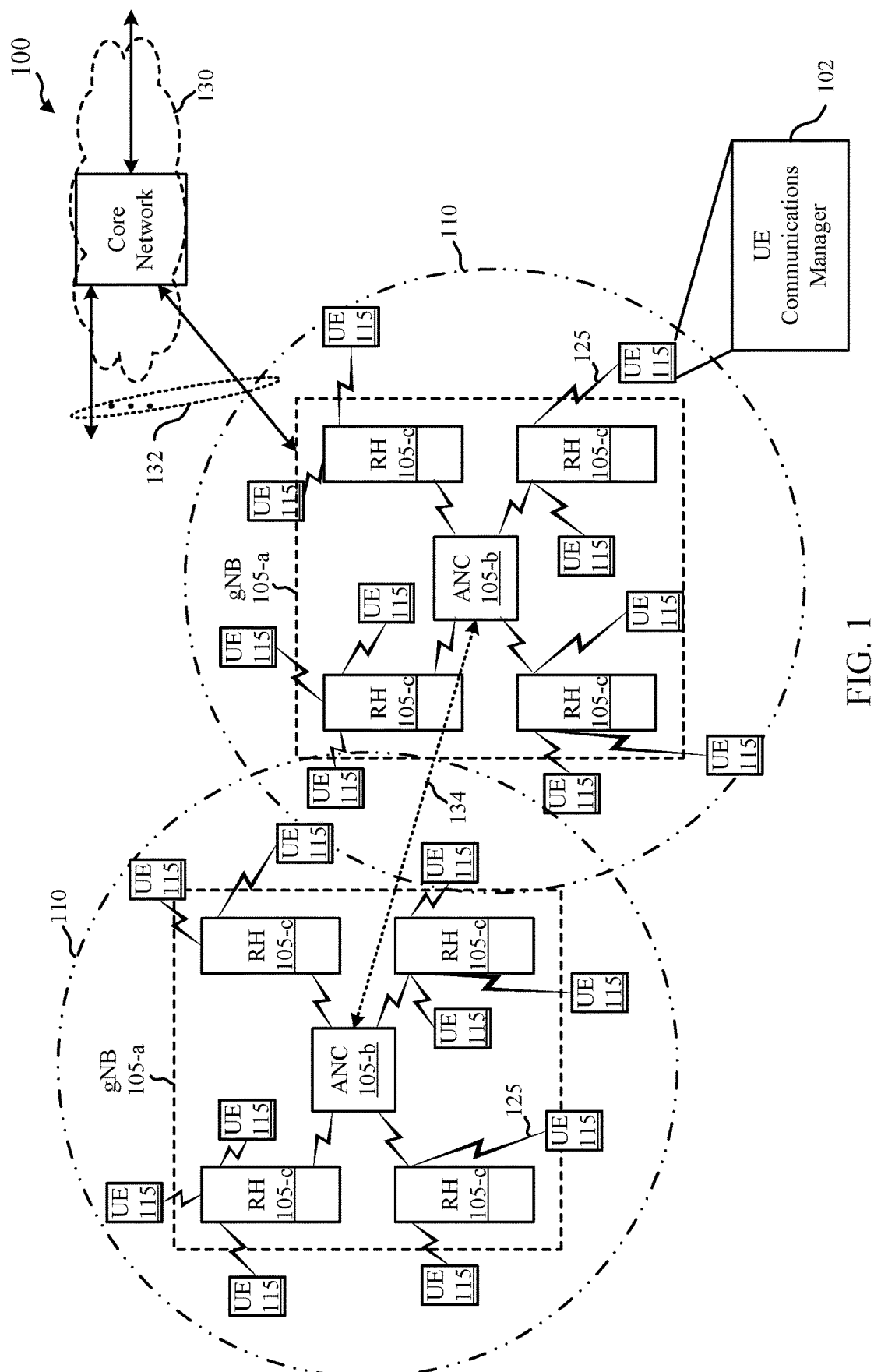
FIG. 1 illustrates an example of a system for wireless communication that supports eV2X RAT migration, in accordance with one or more aspects of the present disclosure.

Aspects of the disclosure are initially described in the context of a wireless communications system. Heterogeneous wireless communications systems may evolve and include devices configured to use different formats, protocols, RATs, etc. In one example, a wireless communications system may support communications (e.g., V2X related communications) using a radio access network (RAN) Release 14 (r14) format, a RAN Release 15 (r15) format, a RAN Release 16 (r16) format, and the like. Moreover, certain evolutions may include the addition of advanced communication protocols, such as transitioning from an LTE configured protocol to an NR configured protocol, e.g., a r15 LTE V2X protocol and a r16 NR V2X protocol.

Moreover, certain formats/protocols may be associated with different features. For example, a r14 V2X configured device may support broadcast traffic messages, may support using safety messages, and the like. In some examples, a r14 V2X configured device may be configured to send safety messages (e.g., a basic safety message (BSM), a cooperative awareness message (CAM), and the like). A r15 V2X configured device may support co-existence with r14 devices, may or may not use the same scheduling assignment (SA) format, may use carrier aggregation (CA), may use different coding schemes (e.g., 64 quadrature amplitude modulation (QAM)), may use a shorter transmission time interval (TTI), and the like. In some examples, a r15 V2X configured device may send safety messages (e.g., either in r14 or r15 format), may decode r14 configured messages, etc. A r16 V2X configured device may be configured for LTE V2X operations and NR V2X operations. The r16 V2X device may include new functionality (e.g., higher MCS), different resource pools, support millimeter wave (mmW) communications, and may or may not be used for safety messages. For example, a r16 LTE V2X configured device may send safety messages in r14, r15, and/or r16 format configurations. A r16 NR V2X configured device may or may not send safety messages, may use different channels, different services, etc.

Aspects of the present disclosure provide for safety message compatibility, determine when to implement r15 features/enhancements, when to turn on r15/r16 format features/enhancements and coordination of NR operations, and/or detection of NR capabilities and services. For example, a UE (e.g., a V2X UE) may be configured such that an upper layer may control generation of a message by a lower layer based on a service identifier. For example, the upper layer may select the service identifier (e.g., provider service identifier (PSID)) based on the supported format. The upper layer may convey or otherwise provide the service identifier to the lower layer and, based on the service identifier, the lower layer may generate message(s) in the appropriate format (e.g., r14, r15, etc.).

In some aspects, a UE (e.g., a V2X UE) may be configured such that an upper layer may control the use of a channel by a lower layer based on parameters indicative of a RAT. For example, the upper layer of the UE may select which RAT to use for communications with neighboring UEs and select parameters associated with the RAT. The upper layer may convey or otherwise provide an indication of the parameters to the lower layer and the lower layer may transmit on that channel based on the indication.

In some aspects, a UE (e.g., a V2X UE) may select the format to use for communicating with neighboring UEs. For example, the UE may determine that it supports multiple formats (e.g., r14, r15, r16, LTE, NR) and then monitor messages received from neighboring UEs. The UE may use any indications in the messages to determine which formats the neighboring UEs support. Accordingly, the UE may select the format to use for communications with the neighboring UEs dependent upon the indicated formats received in the messages. In one non-limiting example, the UE may select a r15 or r16 format to use when all neighboring UEs support such formats. However, when a neighboring UE only supports r14, the UE may select a r14 format for communications with the neighboring UEs.

Aspects of the disclosure are further illustrated by and described with reference to apparatus diagrams, system diagrams, and flowcharts that relate to eV2X RAT migration.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 illustrates an example of a wireless communications system 100, in accordance with one or more aspects of the present disclosure. The wireless communications system 100 includes base stations 105 (e.g., gNBs 105-$a$ including access node controller(s) (ANC)(s) 105-$b$, and/or radio heads (RHs) 105-$c$), UEs 115, and a core network 130. In some examples, the wireless communications system 100 may be a LTE, LTE-Advanced (LTE-A) network, or a NR network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105 may include subcomponents such as an access network entity 105-$b$, which may be an example of an access node controller (ANC). Each access network entity 105-$b$ may communicate with a number of UEs 115 through a number of other access network transmission entities 105-$c$, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support mmW communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid Automatic Repeat Request (HARQ) to provide retransmission at the MAC layer to improve link efficiency. In the control plane, the Radio Resource Control (RRC) protocol layer may provide establishment, configuration, and maintenance of an RRC connection between a UE 115 and a network device 105-*c*, network device 105-*b*, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200\ T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link).

An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communication system 100 may utilize both licensed and unlicensed radio frequency spectrum bands. For example, wireless communication system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD or a combination of both.

In some aspects, a UE 115 may include a UE communications manager 102. The UE communications manager 102 may be configured to transmit a message to a neighboring UE 115 via multiple formats, identify a service parameter indicative of a format to be used for the message. The UE communications manager 102 may convey information indicating the service parameter from a first layer of the UE 115 to a second layer of the UE 115, wherein the first layer is an upper layer with respect to the second layer. The UE communications manager 102 may generate, by the second layer and based at least in part on the information, the message in the format for communicating with the neighboring UE.

Additionally, the UE communications manager 102 may be configured to transmit a message to a neighboring UE via multiple protocols and select one or more parameters indicative of a RAT to be used for the message. The UE communications manager 102 may convey information indicating the one or more parameters from a first layer of the UE 115 to a second layer of the UE 115, wherein the first layer is an upper layer with respect to the second layer. The UE communications manager 102 may instantiate, by the second layer and based at least in part on the parameter, a channel for communications with the neighboring UE according to the RAT.

Further, the UE communications manager 102 may determine that the UE 115 supports communicating using a first format and a second format, the first format being a legacy format with respect to the second format. The UE communications manager 102 may receive one or more messages from one or more neighboring UEs. The UE communications manager 102 may determine, based at least in part on the one or more messages, that the one or more neighboring UEs support communications using the second format. The UE communications manager 102 may select the second format for communications with the one or more neighboring UEs.

Figure 2:
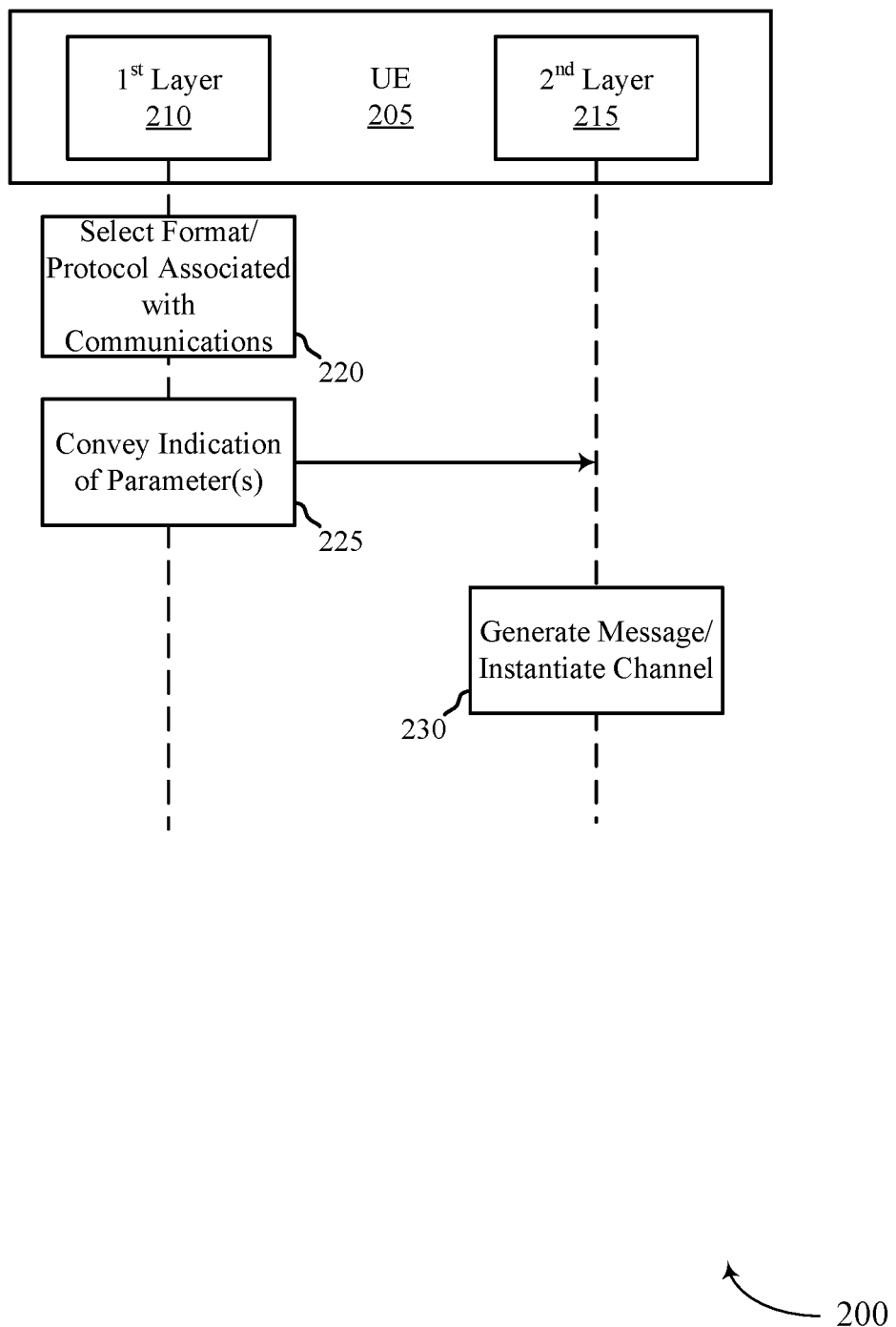
FIG. 2 illustrates an example of a process that supports eV2X RAT migration, in accordance with one or more aspects of the present disclosure.

FIG. 2 illustrates an example of a process 200 that supports eV2X RAT migration, in accordance with one or more aspects of the present disclosure. In some examples, process 200 may implement aspects of wireless communication system 100. Process 200 may include a UE 205, which may be an example of the corresponding devices described herein. In some aspects, the UE 205 may be a V2V or V2X configured device or UE. UE 205 may include a first layer 210 and a second layer 215. The first layer 210 may be an upper layer with respect to the second layer 215. Broadly, process 200 illustrates one example of the UE 205 configured to determine safety message compatibility and/or when to use r15 features/enhancements.

In some aspects, process 200 may provide for BSM/CAM/Decentralized Environmental Notification (DENM) compatibility. According to r14 protocols, such safety messages may be required to be decodable by all vehicles in a V2X implementation. However, a r14 configured UE may not be able to decode a r15 configured message, e.g., r15 messages may use a higher MCS, such as 64 QAM. Moreover, process 200 may provide for a determination of when to use r15 configured features/enhancements. This may be particularly relevant when the upper layer does not understand which formats are being used, for example.

In some aspects, a group of V2V or V2X configured UEs may include a mix of r14, r15, and r16 configured UEs. However, the safety messages exchanged between the UEs may need to be understood by all UEs within range. In some aspects, process 200 implements one example of where the upper layer (e.g., the first layer 210) selects the format and/or protocol to use for communications with other UEs, e.g., other V2V or V2X configured UEs. Generally, the UE 205 may be configured to transmit message(s) to neighboring UEs using multiple formats, protocols, etc.

At 220, the first layer 210 may identify or select a service parameter that is indicative of a format to be used for communicating messages to the neighboring UEs. In some aspects, the first layer 210 may identify or select parameter(s) indicative of or otherwise associated with a RAT that may be used for communicating the messages to the neighboring UEs.

In some aspects, while some services (e.g., safety messages) may have legacy support, certain features may be configured for r15 configurations and above and therefore may only use a r15 (or r16) configuration formats. For example, the service parameter may be a service identifier, e.g., a PSID, an intelligent transport system application object identifier (ITS-AID), and the like. In some aspects, the service parameter may be associated with the particular service, e.g., a vehicle platooning operation, a cooperative adaptive cruise control operation, a sensor sharing operation, and the like. In some aspects, a particular service may obtain a service identifier for the service and the UE 205 may be configured with a list of PSIDs that can use r15 configuration formats. In another example, the UE 205 may be configured such that any PSID not configured or associated with legacy support (e.g., r14 support) may be assumed to use r15 configuration formats. UE 205 may determine the message transmission format based on the r15 configurations.

In some aspects, the first layer 210 may identify the parameter by identifying a QoS metric, a PPPP, a service identifier (e.g., PSID), an identifier associated with the second layer 215 (e.g., a L2ID or L2 ID). Accordingly, the selected parameter may include one or more of the QoS metric, the PPPP, the PSID, the L2ID, and the like. The QoS metric may be associated with a VQI. In some aspects, the first layer 210 may access a preconfigured list or rule to identify the parameters and/or may receive the list or rule from a network entity.

Thus, in some aspects, UE 205 may classify the messages (e.g., the messages are sent down to the second layer 215 with the PSID) based on the PSID/ITS-AID. UE 205 may be configured with a mapping between the PSID and the service parameters, e.g., a mapping between the PSID and which RAN release will be used to communicate safety messages. In some aspects, the mapping may be between a combination of any of the PSID, QoS metric, the PPPP, and the L2ID to the RAT or transmission characteristics and parameters. In some aspects, the mapping may be between the combination of any of the PSID, QoS metric, the PPPP, and the L2 ID to a flag. The flag may indicate for example, if the message needs to be decoded by a legacy UE, e.g. using r14 format. The first layer 210 may specify or otherwise determine the second layer 215 behavior in the presence of the flag, e.g., may determine whether the second layer 215 uses r14, r15, or r16 protocols. In some examples, the flag may provide an indication of whether legacy support is required, e.g., a binary flag. The flag may be decided by the first layer 210 based on a combination of the PPPP, the PSID, etc. The flag may be passed to the second layer 215 together with the data packet. Based on the flag, the second layer 215 may determine which format to use, e.g., r14/r15, a reduced rate MCS, etc. In some aspects, the flag may be extended to indicate additional information and, in some instances, used for r16 regarding the support of a legacy RAT. That is, the first layer 210 may use the PSID based control when deciding the second layer 215 behavior.

At 225, the first layer 210 may convey to the second layer 215 a message or information indicating the service parameter. In some aspects, the first layer 210 may convey to the second layer 215 a message or information indicating the parameter(s) indicative of the RAT to be used for inter-UE communications.

In some aspects, the first layer 210 may include in the message or information the flag to indicate the service parameter. For example, the first layer 210 may determine whether to include the flag in the message or information based on a listing of service identifiers (e.g., PSID) associated with the format. As also discussed, the first layer 210 may classify the message or information based on the service parameter.

In some aspects, the first layer 210 may convey the information on a per-packet basis. For example, the first layer 210 may generate each packet to indicate the QoS metric, the PPPP, the PSID, and/or the L2ID to the second layer 215. In some aspects, this may include a per packet indication from the first layer 210 (e.g., an application layer). The application layer may associate with each packet the QoS metric: PPPP, etc. In some aspects, this may be associated with key performance indicators (KPI) associated with the communications with the neighboring UEs. In some aspects, a VQI table may be standardized to reflect KPIs for the application layer to use, e.g., VQI-to-packet delay budget (PDB), message frequency, message size range, reliability, rate range etc. The RAT may be chosen per packet based on the VQI.

At 230, the second layer 215 may generate a message in the format for communicating with the neighboring UE based on the service parameters indicated in the information. In some aspects, the second layer 215 may use a channel for communicating with the neighboring UEs according to the RAT associated with the parameters. The UE 205 may transmit the generated message and/or use the channel to the neighboring UEs according to the format/RAT.

In some aspects, the second layer 215 may generate the message as one of a plurality of available versions of V2X messages, e.g., depending upon the V2X service, based on the format/RAT, etc. Thus, UE 205 may communicate with the neighboring UEs using the generated message that, in some instances, may be a safety message associated with vehicle-based operations, e.g., V2V, V2X, etc. In some aspect, the second layer 215 may generate the message with other access technology, e.g., using direct short range communications (DSRC)/wireless access in vehicular environments (WAVE) protocols beside LTE or NR V2X, if indicated in the information.

In some aspects, the second layer 215 may generate or configure a virtual bearer based on the parameter(s) indicated from the first layer 210. For example, the virtual bearer may include a logical bearer and/or a radio bearer. In some examples, the virtual bearer may include an LTE V2X bearer and a set of NR bearers (the set of NR bearers may include zero or one or more NR bearers). In some aspects, the set of NR bearers may be generated dynamically, e.g., generated by the second layer 215 based on the parameters selected by the first layer 210. In some aspects, the virtual bearer is generated based on receiving a message from neighboring UE(s), e.g., triggered by the messages. Receiving the message(s) may trigger activation of an application associated with the virtual bearer. In some aspects, the second layer 215 may use an LTE channel by default and then set up a NR channel dynamically based on receiving message(s) from the neighboring UEs. In some aspects, there may be multiple LTE V2X bearers established, representing r14 and r15 formats, respectively.

In some aspects, the virtual bearer set up may be based on a QoS request from the application layer (e.g., the first layer 210). In some examples, this may be implemented for non-broadcast traffic (e.g., a groupcast and/or unicast transmission). The application layer may send a setup request for a specific combination of L2 ID, PPPP, VQI, and/or QoS metrics. This may trigger the another layer (e.g., a V2X layer) to request the lower layer (e.g., the second layer 215) to setup a virtual bearer, which in turn determines the RAT. The following traffic (e.g., messages, communications, etc.) may be identified by the PSID and L2 ID by the V2X layer. In the instance where the requested RAT is not supported, the application layer may be informed via a reject message, and it may not send such traffic according to the protocols.

In some aspects, the virtual bearer may determine the logical bearer and/or the physical characteristics of the bearer (e.g., physical layer resources, coding schemes, etc.). The configuration may indicate the mapping of the packets to the virtual bearer (e.g., in an uplink traffic flow template (TFT) manner). The virtual bearer concept (LTE V2X being the default bearer and setup by default; and a NR with different NR bearers with different characteristics and set up on demand) may be associated with different triggers/control logic for setting up the virtual bearer. In one example, receiving a message at lower layer (e.g., second layer 215) on a NR, receiving an indication from the LTE V2X layer, e.g. BSM/CAM/DENM messages, and/or an application layer trigger. In some aspects, any extra function may be specified at the LTE V2X layer, e.g. similar to an uplink TFT enforcement at the non-access stratum (NAS) layer for a LTE Uu interface. The mapping information, e.g., TFT, may be preconfigured on the UE, or provisioned/signaled from the network when needed. For example, upper layer provisioning protocol or access stratum protocol, e.g. RRC, may be used for disseminating such configuration. The bearer binding may include a "logical channel+radio bearer+RAT" towards the bearer, e.g., for the transmit side. On the receive side, receiving a packet on a RAT may trigger setting up of the bearer and/or wake up of the application layer, e.g., similar to an internet-of-things (IoT) triggering message. In some aspects, the BSM may be extended to turn on the other UE's application/bearer (e.g. BSM includes additional PSIDs or other application layer identifiers for an application the UE 205 is sending on other messages). For example, a BSM may have an associated PSID and UE 205 may be sending other types of messages, e.g., a local dynamic map (LDM) message, a signal phase and timing (SPAT) message, sensor sharing messages, and the like, and each additional message type may have an associated PSID (e.g., located in the header of the additional messages). In some aspects, additional information may be added to the LTE V2X layer header to indicate what service is running and trigger the receiver to setup the corresponding virtual bearer (or even wake up the application). The V2X layer header (above the PDCP layer) may be common for all the LTE and NR RATs and may include such extra information for triggering.

In some aspects, the spectrum may also play a role in the RAT selection. The UE 205 may be configured with PSID-to-spectrum mapping configuration and may use the available spectrum limitation to choose the RAT.

Thus, the second layer 215 may generate messages and/or instantiate a channel to use for communications with neighboring UE(s). Such communications may include vehicle-based operations, e.g., V2V, V2X, etc., operations. The communications according to the RAT may include a supported broadcast traffic function, a safety message function, a SA, a CA, a MCS, and/or a TTI.

Figure 3:
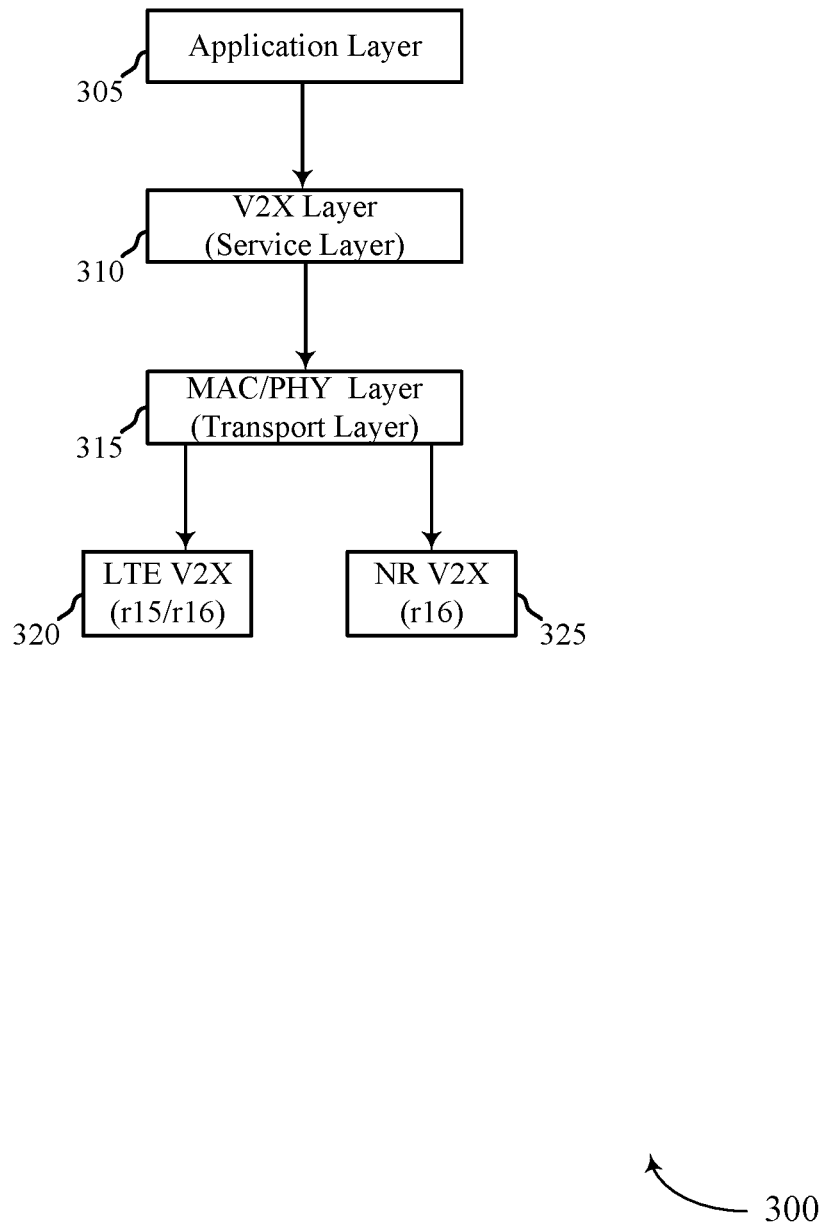
FIG. 3 illustrates an example of a layer configuration that supports eV2X RAT migration, in accordance with one or more aspects of the present disclosure.

FIG. 3 illustrates an example of a layer configuration 300 that supports eV2X RAT migration, in accordance with one or more aspects of the present disclosure. In some examples, layer configuration 300 may implement aspects of wireless communication system 100. Layer configuration 300 may implement aspects of wireless communication system 100 and/or process 200, as described herein. In some aspects, layer configuration 300 may be implemented on a UE, such as a V2X configured UE.

Layer configuration 300 may include an application layer 305, a V2X layer 310 (e.g., that acts as a service layer), and/or a MAC/PHY layer 315 (e.g., that acts as a transport layer). The MAC/PHY layer 315 may be used to generate a LTE V2X RAT 320 and/or a NR V2X RAT 325. The LTE V2X RAT 320 may be associated with r15 and/or r16 and the NR V2X RAT 325 may be associated with r16.

In some examples, the first layer described herein may refer to the application layer 305 and the second layer may refer to the MAC/PHY layer 315. In some examples, the V2X layer 310 may be considered an intermediate layer, may be included in the first layer, and/or may be included in the second layer.

Thus, the application layer 305 may identify service parameter(s) indicative of a format to be used for messages and/or communications with neighboring UEs. The application layer 305 may convey information indicating the service parameter to the MAC/PHY layer 315 (e.g., via the LTE V2X layer 320). The MAC/PHY layer 315 may generate the message and/or communications with the neighboring UE according to the format, e.g., as indicated in the information conveyed from the application layer 305.

In some aspects, the application layer 305 may select parameter(s) indicative of a RAT to be used for the message and/or communications. The application layer 305 may convey information indicating the parameter(s) to the MAC/PHY layer 315. The MAC/PHY layer 315 may use the parameter(s) to instantiate a channel for communications with the neighboring UEs according to the RAT.

Figure 4:
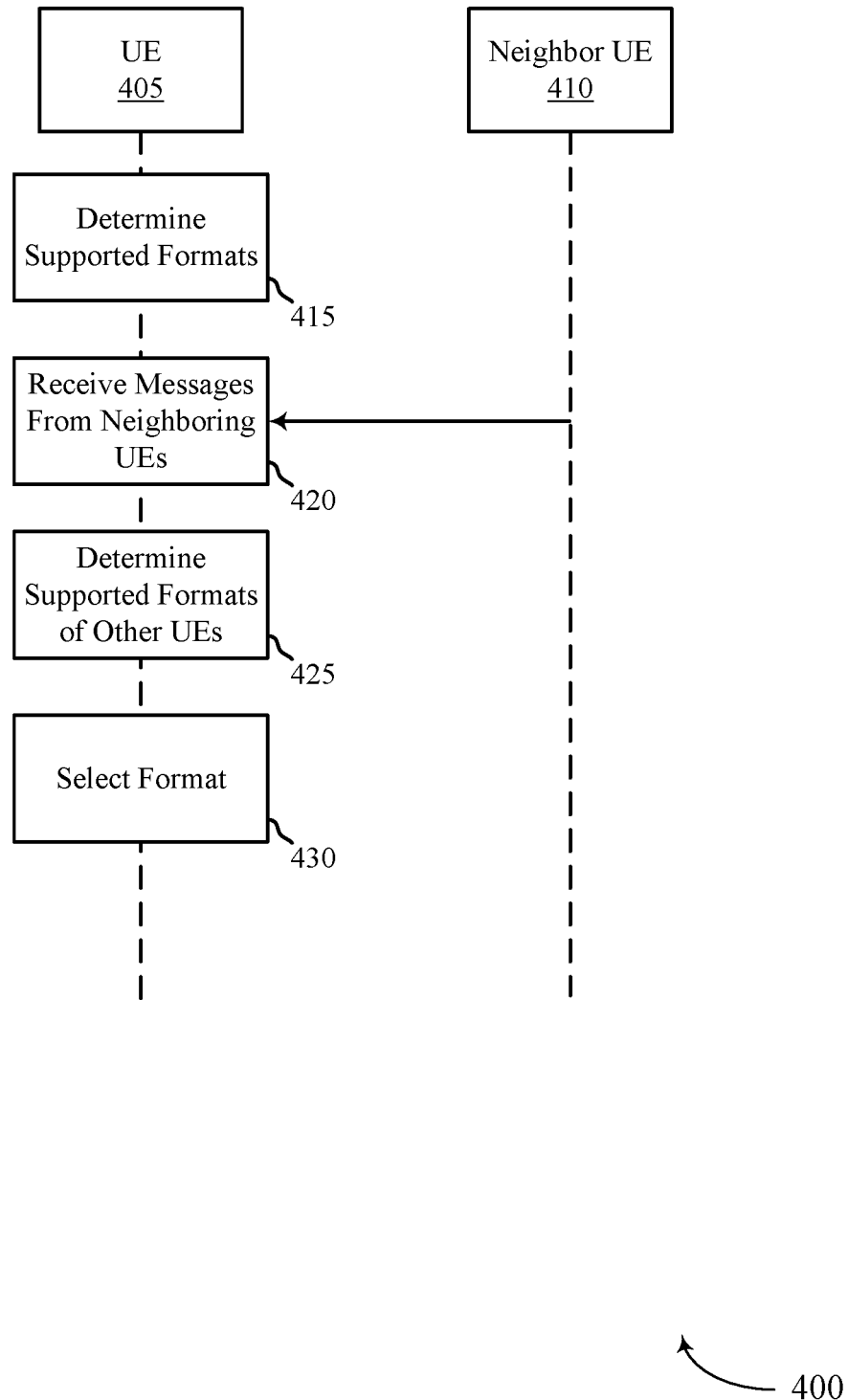
FIG. 4 illustrates an example of a process that supports eV2X RAT migration, in accordance with one or more aspects of the present disclosure.

FIG. 4 illustrates an example of a process 400 that supports eV2X RAT migration, in accordance with one or more aspects of the present disclosure. In some examples, process 400 may implement one or more aspects of wireless communication system 100, process 200, and/or layer configuration 300, as described herein. Process 400 may include a UE 405 and a neighbor UE 410, which may be examples of the corresponding devices described herein.

In some aspects, process 400 may support dynamic detection of the format(s) to use base on periodical safety messages (e.g., BSM/CAM, etc.). UE 405 may only use a legacy format (e.g., a r14 format) when other r14 configured UEs are present. Generally, UE 405 may detect the presence of r14 configured UEs (e.g., determine if neighboring UEs support r15 formats even when UE 405 is transmitting in a r14 format). UE 405 may decode messages received from neighboring UEs and decode the SA and/or header portions of the message to identify an indication of whether the neighboring UE supports r15 format, e.g., a capability indication. UE 405 may only use the r15 format when it does not receive any indication from neighboring UEs of r14 use for a configurable time period. In some aspects, process 400 may be implemented in addition to the features described with reference to process 200. Process 400 may also support UE 405 determining when to use r15 features/enhancements.

At 415, UE 405 may determine that it supports multiple formats. For example, UE 405 may determine that it supports communicating using a first format and a second format. The first format may be a legacy format with respect to the second format, e.g., the first format may be a r14 format and the second format may be a r15 and/or r16 format.

At 420, neighbor UE 410 may transmit (and UE 405 may receive) message(s). In some aspects, the message(s) may carry or otherwise convey an indication that the neighbor UE 410 supports the second format, e.g., r15 and/or r16. For example, the SA associated with the message and/or a header in the message may carry or otherwise convey the indication that neighbor UE 410 supports the second format. In some aspects, the messages may be safety messages that are configured according to the first format, e.g., r14 configuration. In some aspects, the messages may include a service identifier (e.g., a PSID) that indicates the UE supports communicating using the second format.

At 425, UE 405 may determine the supported formats of the neighboring UEs. For example, UE 405 may determine, based on the messages, whether the neighbor UE 410 supports communicating using the second format. UE 405 may determine the support by decoding a SA for the message. UE 405 may determine the support by decoding a header portion (or multiple header portions) in the messages, e.g., a MAC header, an RLC header, and/or a PDCP header, and the like.

At 430, UE 405 may select the second format for communications with the neighbor UE 410. For example, UE 405 may instantiate a LTE channel bearer by default and then set up a NR channel bearer(s) dynamically based on receiving a message from the neighboring UE that triggers setting up the NR channel bearer(s).

In some aspects of the described techniques, the UE 405 may be configured to detect neighbor UE 410 NR V2X capability. In the situation where NR V2X operations do not include safety applications, periodic safety messages may be absent (e.g., BSM/CAM). In other situations, r15/r16 LTE V2X may include safety messages, e.g., BSM/CAM may be transmitted periodically due to the safety mandate. In a first aspects, a LTE V2X assisted NR capability discovery may include, within a message sent using r14/r15 format, the indication of NR capability may be added to the message. This may include a field defined in r15 LTE V2X message format as reserved, and a r16 configured UE may set the field accordingly to indicate NR capability. In a second approach for standalone NR operations, a service/capability discovery messages may be transmitted over the NR directly. For example, UE 405 may send periodic capability discovery messages in broadcast mode over NR. In a third approach, an LTE based capability exchange may be used when NR transmission is needed. For example, UE 405 may request NR capability info from a specific target neighboring UE.

Figure 5:
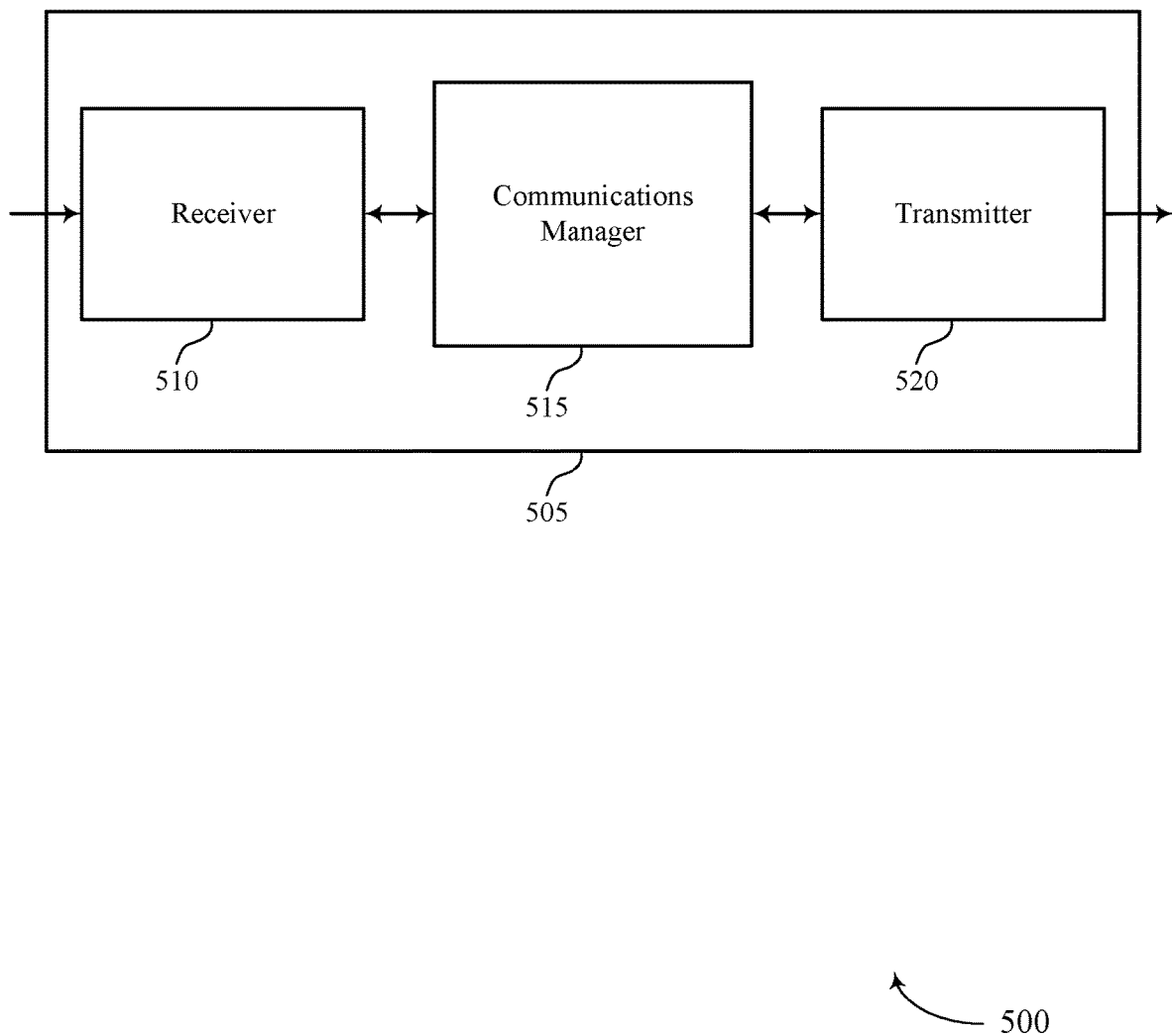
FIGS. 5 through 7 show block diagrams of a device that supports eV2X RAT migration, in accordance with one or more aspects of the present disclosure.

FIG. 5 shows a block diagram 500 of a wireless device 505 that supports eV2X RAT migration, in accordance with one or more aspects of the present disclosure. Wireless device 505 may be an example of aspects of a UE 115 as described herein. Wireless device 505 may include receiver 510, communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to eV2X RAT migration, etc.). Information may be passed on to other components of the device. The receiver 510 may be an example of aspects of the transceiver 835 described with reference to FIG. 8. The receiver 510 may utilize a single antenna or a set of antennas.

Communications manager 515 may be an example of aspects of the communications manager 815 described with reference to FIG. 8.

Communications manager 515 and/or at least some of its various sub-components may be implemented in hardware, software executed by a processor, firmware, or any combination thereof. If implemented in software executed by a processor, the functions of the communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 515 and/or at least some of its various sub-components may be physically located at various positions, including being distributed such that portions of functions are implemented at different physical locations by one or more physical devices. In some examples, communications manager 515 and/or at least some of its various sub-components may be a separate and distinct component in accordance with various aspects of the present disclosure. In other examples, communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In some aspects, communications manager 515 may identify, at a UE that is configured to transmit a message to a neighboring UE via multiple formats, a service parameter indicative of a format to be used for the message. Communications manager 515 may convey information indicating the service parameter from a first layer of the UE to a second layer of the UE, where the first layer is an upper layer with respect to the second layer. Communications manager 515 may generate, by the second layer and based on the information, the message in the format for communicating with the neighboring UE.

In some aspects, communications manager 515 may select, at a UE that is configured to transmit a message to a neighboring UE via multiple protocols, one or more parameters indicative of a RAT to be used for the message. Communications manager 515 may convey information indicating the one or more parameters from a first layer of the UE to a second layer of the UE, where the first layer is an upper layer with respect to the second layer. Communications manager 515 may instantiate, by the second layer and based on the parameter, a channel for communications with the neighboring UE according to the RAT.

In some aspects, communications manager 515 may determine that the UE supports communicating using a first format and a second format, the first format being a legacy format with respect to the second format. Communications manager 515 may receive one or more messages from one or more neighboring UEs. Communications manager 515 may determine, based on the one or more messages, that the one or more neighboring UEs support communications using the second format. Communications manager 515 may select the second format for communications with the one or more neighboring UEs.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
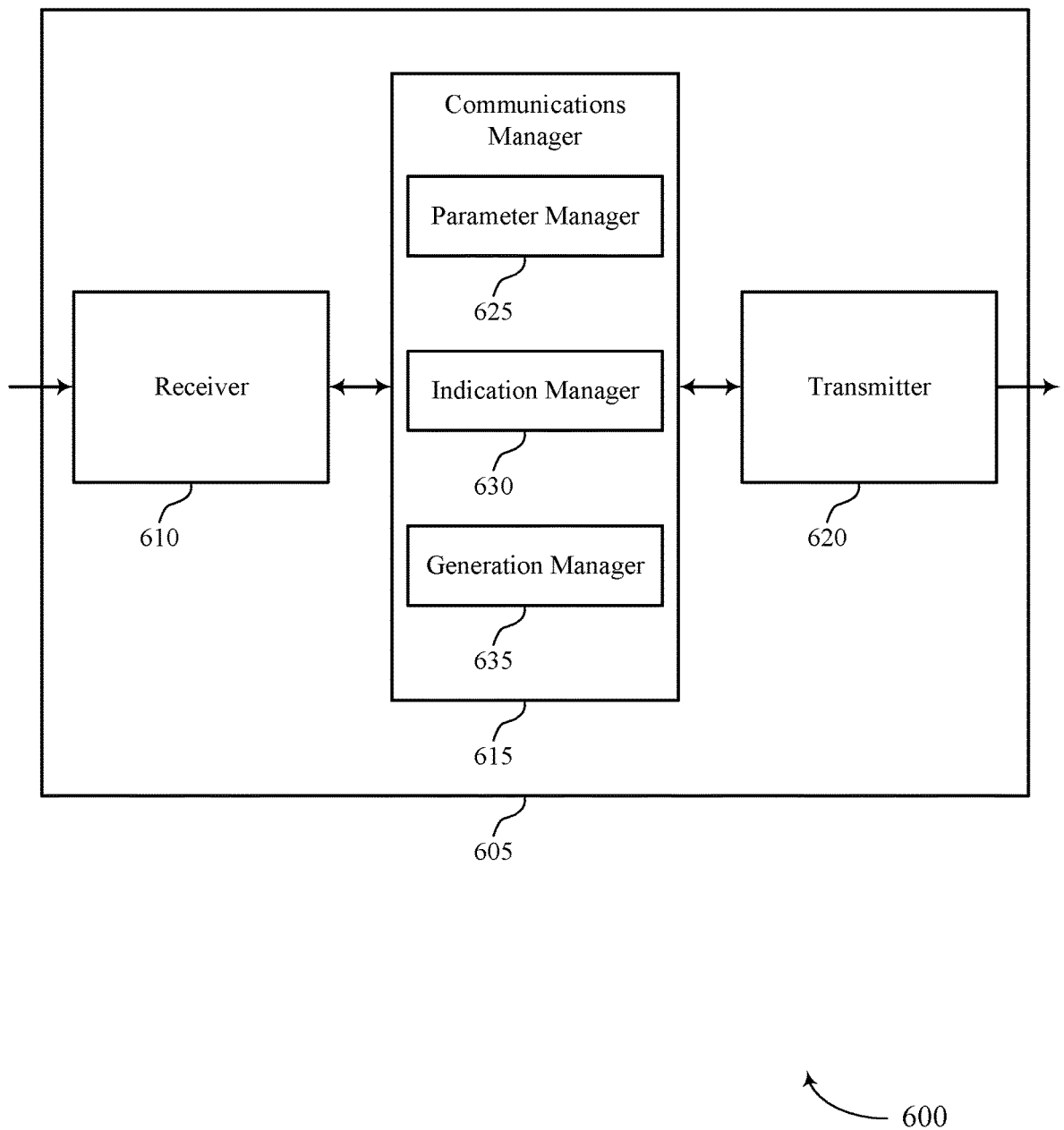

FIG. 6 shows a block diagram 600 of a wireless device 605 that supports eV2X RAT migration, in accordance with one or more aspects of the present disclosure. Wireless device 605 may be an example of aspects of a wireless device 505 or a UE 115 as described herein. Wireless device 605 may include receiver 610, communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to eV2X RAT migration, etc.). Information may be passed on to other components of the device. The receiver 610 may be an example of aspects of the transceiver 835 described with reference to FIG. 8. The receiver 610 may utilize a single antenna or a set of antennas.

Communications manager 615 may be an example of aspects of the communications manager 815 described with reference to FIG. 8. Communications manager 615 may also include parameter manager 625, indication manager 630, and generation manager 635.

Parameter manager 625 may identify, at a UE that is configured to transmit a message to a neighboring UE via multiple formats, a service parameter indicative of a format to be used for the message. Parameter manager 625 may select, at a UE that is configured to transmit a message to a neighboring UE via multiple protocols, one or more parameters indicative of a RAT to be used for the message. Parameter manager 625 may determine that the UE supports communicating using a first format and a second format, the first format being a legacy format with respect to the second format. Parameter manager 625 may determine, based on the one or more messages, that the one or more neighboring UEs support communications using the second format. In some cases, the second format includes a RAN Release 15 or a RAN Release 16 format and the first format includes a RAN Release 14 format.

Indication manager 630 may convey information indicating the service parameter from a first layer of the UE to a second layer of the UE, where the first layer is an upper layer with respect to the second layer. Indication manager 630 may convey information indicating the one or more parameters from a first layer of the UE to a second layer of the UE, where the first layer is an upper layer with respect to the second layer, and receive one or more messages from one or more neighboring UEs.

Generation manager 635 may generate, by the second layer and based on the information, the message in the format for communicating with the neighboring UE. Generation manager 635 may instantiate, by the second layer and based on the parameter, a channel for communications with the neighboring UE according to the RAT. Generation manager 635 may instantiate an LTE channel for communications with the neighboring UE by default and set up a next generation NR channel dynamically based on receiving a message from the neighboring UE triggering the set up of the NR channel. Generation manager 635 may select the second format for communications with the one or more neighboring UEs. In some cases, generating the message includes: generating the message as a version of multiple versions of V2X messages.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
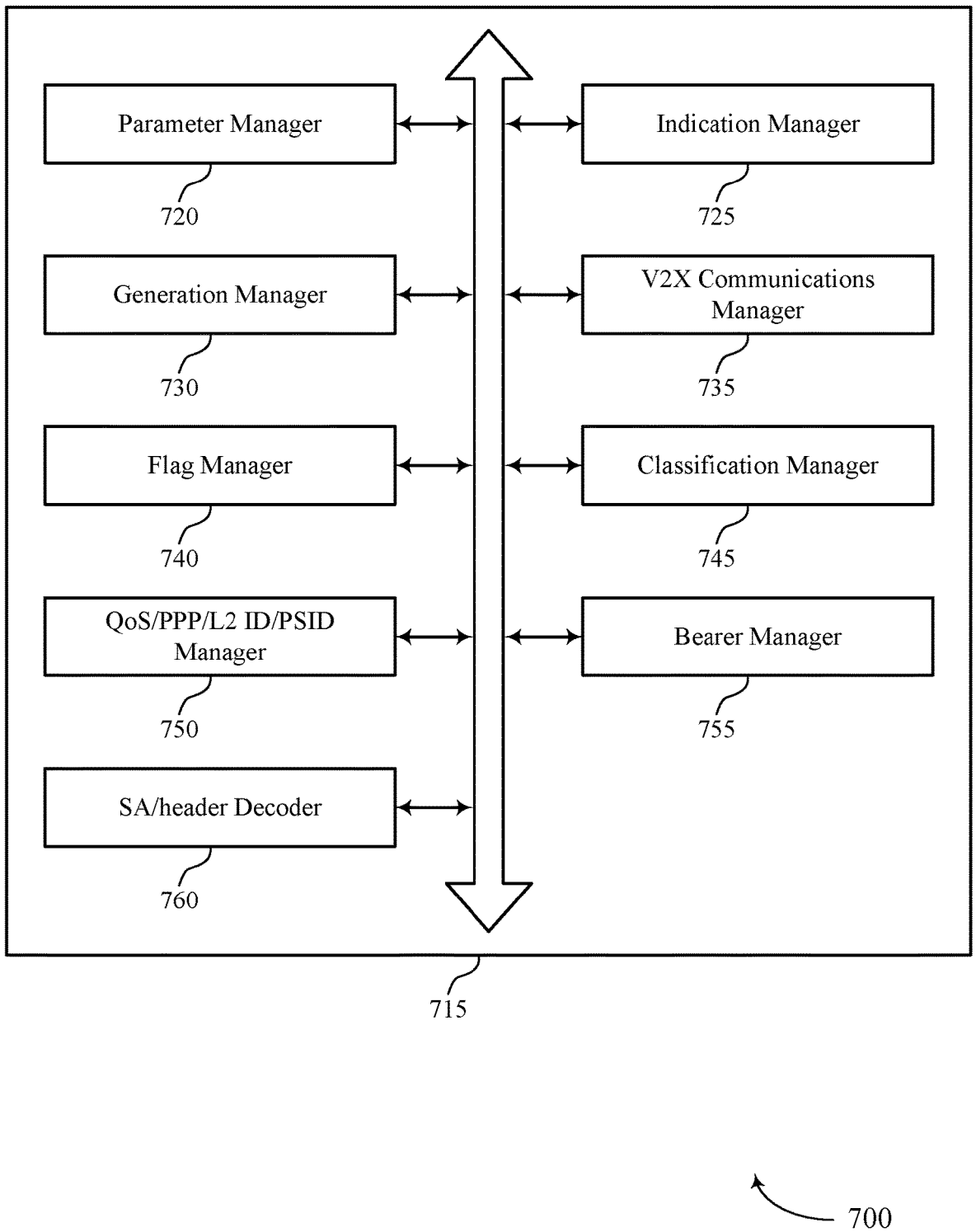

FIG. 7 shows a block diagram 700 of a communications manager 715 that supports eV2X RAT migration, in accordance with one or more aspects of the present disclosure. The communications manager 715 may be an example of aspects of a communications manager 515, a communications manager 615, or a communications manager 815 described with reference to FIGS. 5, 6, and 8. The communications manager 715 may include parameter manager 720, indication manager 725, generation manager 730, V2X communications manager 735, flag manager 740, classification manager 745, QoS/PPP/L2 ID/PSID manager 750, bearer manager 755, and SA/header decoder 760. Each of these modules may communicate, directly or indirectly, with one another (e.g., via one or more buses).

Parameter manager 720 may identify, at a UE that is configured to transmit a message to a neighboring UE via multiple formats, a service parameter indicative of a format to be used for the message. Parameter manager 720 may select, at a UE that is configured to transmit a message to a neighboring UE via multiple protocols, one or more parameters indicative of a RAT to be used for the message. Parameter manager 720 may determine that the UE supports communicating using a first format and a second format, the first format being a legacy format with respect to the second format. Parameter manager 720 may determine, based on the one or more messages, that the one or more neighboring UEs support communications using the second format. In some cases, the second format includes a RAN Release 15 or a RAN Release 16 format and the first format includes a RAN Release 14 format.

Indication manager 725 may convey information indicating the service parameter from a first layer of the UE to a second layer of the UE, where the first layer is an upper layer with respect to the second layer. Indication manager 725 may convey information indicating the one or more parameters from a first layer of the UE to a second layer of the UE, where the first layer is an upper layer with respect to the second layer, and receive one or more messages from one or more neighboring UEs.

Generation manager 730 may generate, by the second layer and based on the information, the message in the format for communicating with the neighboring UE. Generation manager 730 may instantiate, by the second layer and based on the parameter, a channel for communications with the neighboring UE according to the RAT. Generation manager 730 may instantiate an LTE channel for communications with the neighboring UE by default and set up a next generation NR channel dynamically based on receiving a message from the neighboring UE triggering the set up of the NR channel. Generation manager 730 may select the second format for communications with the one or more neighboring UEs. In some cases, generating the message includes: generating the message as a version of multiple versions of V2X messages.

V2X communications manager 735 may transmit the configured message to the neighboring UE according to the format. V2X communications manager 735 may access, by the first layer, either a preconfigured rule or a rule received from a network entity to select the one or more parameters. In some cases, the message is associated with a service, and where identifying the service parameter includes: selecting a service identifier associated with the service. In some cases, the service includes a cooperative adaptive cruise control service, a platooning operation service, or a sensor sharing service. In some cases, the communicating with the neighboring UE include communicating a safety message associated with vehicle-based operations. In some cases, the communication according to the RAT includes one or more of a supported broadcast traffic function, a safety message function, a scheduling assignment, a carrier aggregation, a MCS, and a TTI. In some cases, the communications with the neighboring UE include communicating a message associated with vehicle-based operations. In some cases, the one or more messages are associated with safety messages configured according to the first format. In some cases, the one or more messages include a service identifier, where the service identifier conveys an indication that the UE supports communications using the second format.

Flag manager 740 may include in the message, and by the first layer, a flag to indicate the service parameter. In some cases, including the flag includes: determining whether to include the flag in the message based on a listing of service identifiers associated with the format. Classification manager 745 may classify the message based at least on the service parameter.

QoS/PPP/L2 ID/PSID manager 750 may identify, by the first layer, one or more of a QoS metric, a PPPP, a service identifier, and an L2ID, associated with the communications with the neighboring UE, where the parameter includes one or more of the QoS metric, the PPPP, the service identifier, and the L2ID. QoS/PPP/L2 ID/PSID manager 750 may configure, for each packet of a one or more packets, the packet to indicate one or more of the QoS metric, the PPPP, the service identifier, and the L2ID, to the second layer. In some cases, the QoS metric is associated with a VQI.

Bearer manager 755 may configure, by the second layer and according to the parameter, a virtual bearer to use for communications with the UE. In some cases, the virtual bearer includes one or more aspects of a logical bearer and a radio bearer. In some cases, the virtual bearer includes at least one of a LTE V2X bearer and one or more next generation NR bearers, e.g., zero, one, or a group of NR bearers. In some cases, the one or more virtual NR bearers are instantiated dynamically by the second layer based on the parameters selected by the first layer. In some cases, the virtual bearer is configured based on a message received from the neighboring UE. In some cases, the receipt of the message triggers the activation of an application associated with the virtual bearer.

SA/header decoder 760 may decode, for each received message, a scheduling assignment to determine that the UE support communications using the second format. SA/header decoder 760 may decode, for each received message, a header portion of the message to determine that the UE support communications using the second format. In some cases, the header portion of the message includes a MAC header portion, a RLC header portion, or a PDCP header portion.

Figure 8:
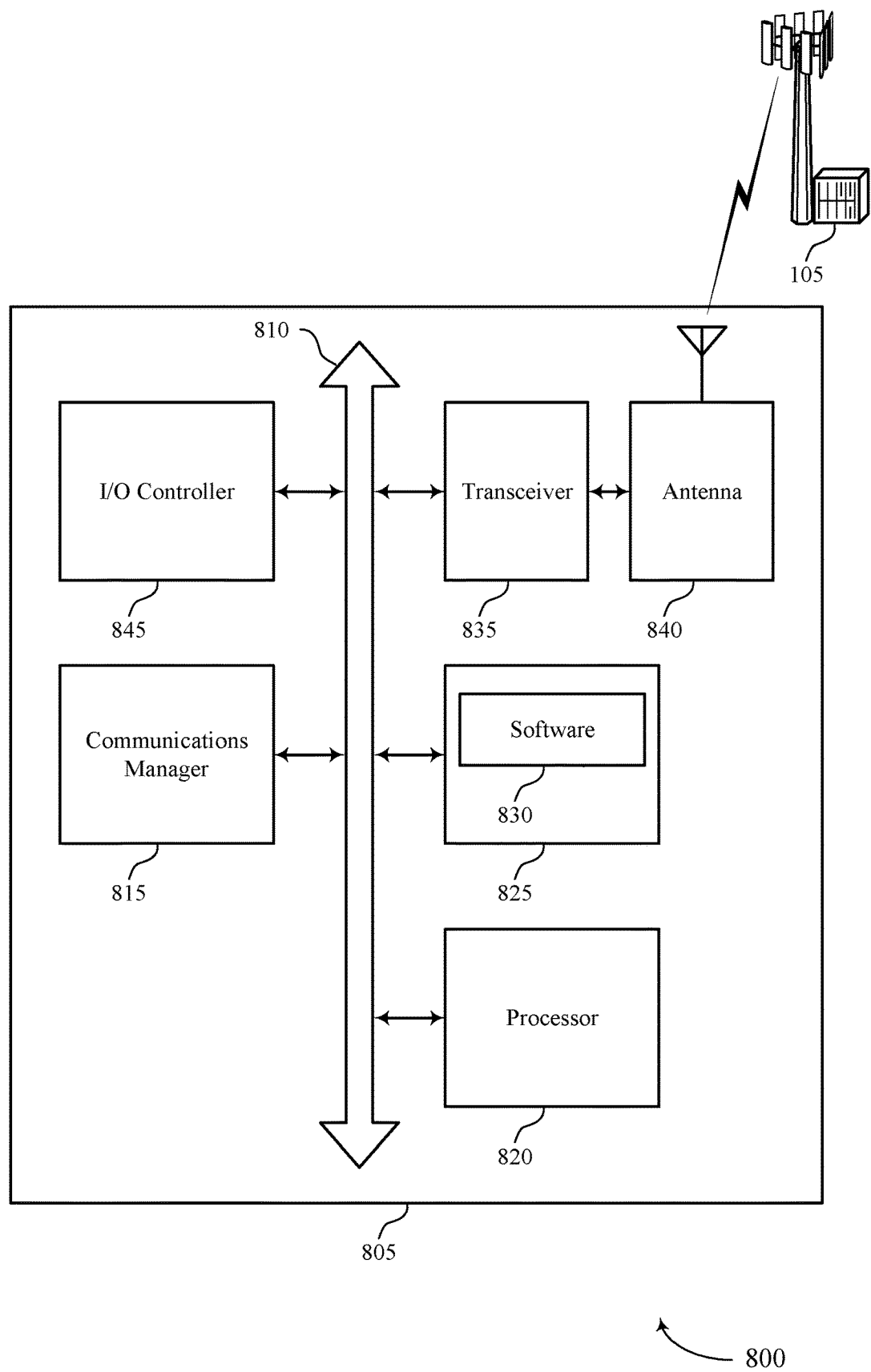
FIG. 8 illustrates a block diagram of a system including a UE that supports eV2X RAT migration, in accordance with one or more aspects of the present disclosure.

FIG. 8 shows a diagram of a system 800 including a device 805 that supports eV2X RAT migration, in accordance with one or more aspects of the present disclosure. Device 805 may be an example of or include the components of wireless device 505, wireless device 605, or a UE 115 as described herein. Device 805 may include components for bi-directional voice and data communications including components for transmitting and receiving communications, including communications manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting eV2X RAT migration).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support eV2X RAT migration. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
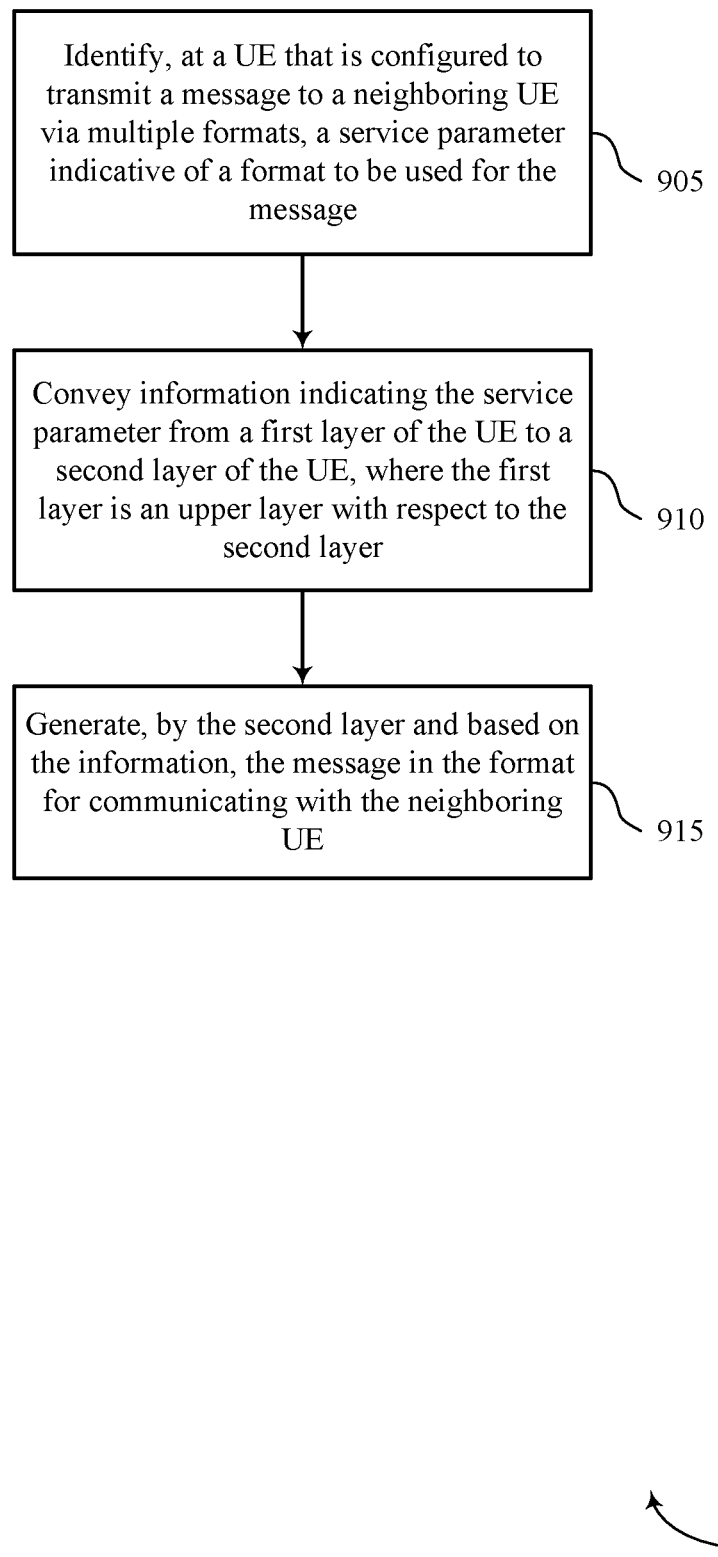
FIGS. 9 through 11 illustrate methods for eV2X RAT migration, in accordance with one or more aspects of the present disclosure.

FIG. 9 shows a flowchart illustrating a method 900 for eV2X RAT migration, in accordance with one or more aspects of the present disclosure. The operations of method 900 may be implemented by a UE 115 or its components as described herein. For example, the operations of method 900 may be performed by a communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 905 the UE 115 may identify, at a UE that is configured to transmit a message to a neighboring UE via multiple formats, a service parameter indicative of a format to be used for the message. The operations of block 905 may be performed according to the methods described herein. In certain examples, aspects of the operations of block 905 may be performed by a parameter manager as described with reference to FIGS. 5 through 8.

At block 910 the UE 115 may convey information indicating the service parameter from a first layer of the UE to a second layer of the UE, wherein the first layer is an upper layer with respect to the second layer. The operations of block 910 may be performed according to the methods described herein. In certain examples, aspects of the operations of block 910 may be performed by an indication manager as described with reference to FIGS. 5 through 8.

At block 915 the UE 115 may generate, by the second layer and based at least in part on the information, the message in the format for communicating with the neighboring UE. The operations of block 915 may be performed according to the methods described herein. In certain examples, aspects of the operations of block 915 may be performed by a generation manager as described with reference to FIGS. 5 through 8.

Figure 10:
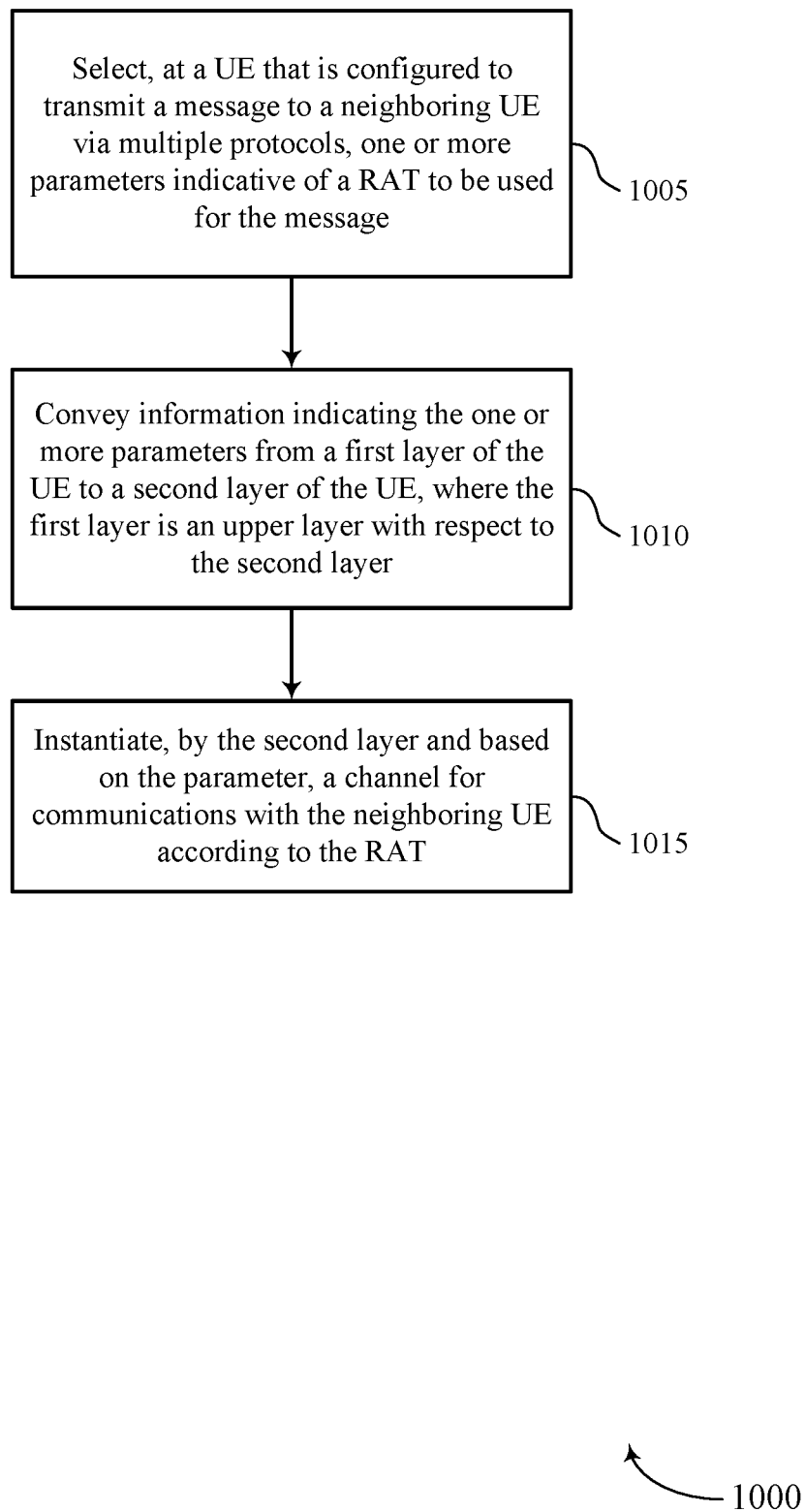

FIG. 10 shows a flowchart illustrating a method 1000 for eV2X RAT migration, in accordance with one or more aspects of the present disclosure. The operations of method 1000 may be implemented by a UE 115 or its components as described herein. For example, the operations of method 1000 may be performed by a communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1005 the UE 115 may select, at a UE that is configured to transmit a message to a neighboring UE via multiple protocols, one or more parameters indicative of a RAT to be used for the message. The operations of block 1005 may be performed according to the methods described herein. In certain examples, aspects of the operations of block 1005 may be performed by a parameter manager as described with reference to FIGS. 5 through 8.

At block 1010 the UE 115 may convey information indicating the one or more parameters from a first layer of the UE to a second layer of the UE, wherein the first layer is an upper layer with respect to the second layer. The operations of block 1010 may be performed according to the methods described herein. In certain examples, aspects of the operations of block 1010 may be performed by an indication manager as described with reference to FIGS. 5 through 8.

At block 1015 the UE 115 may instantiate, by the second layer and based at least in part on the parameter, a channel for communications with the neighboring UE according to the RAT. The operations of block 1015 may be performed according to the methods described herein. In certain examples, aspects of the operations of block 1015 may be performed by a generation manager as described with reference to FIGS. 5 through 8.

Figure 11:
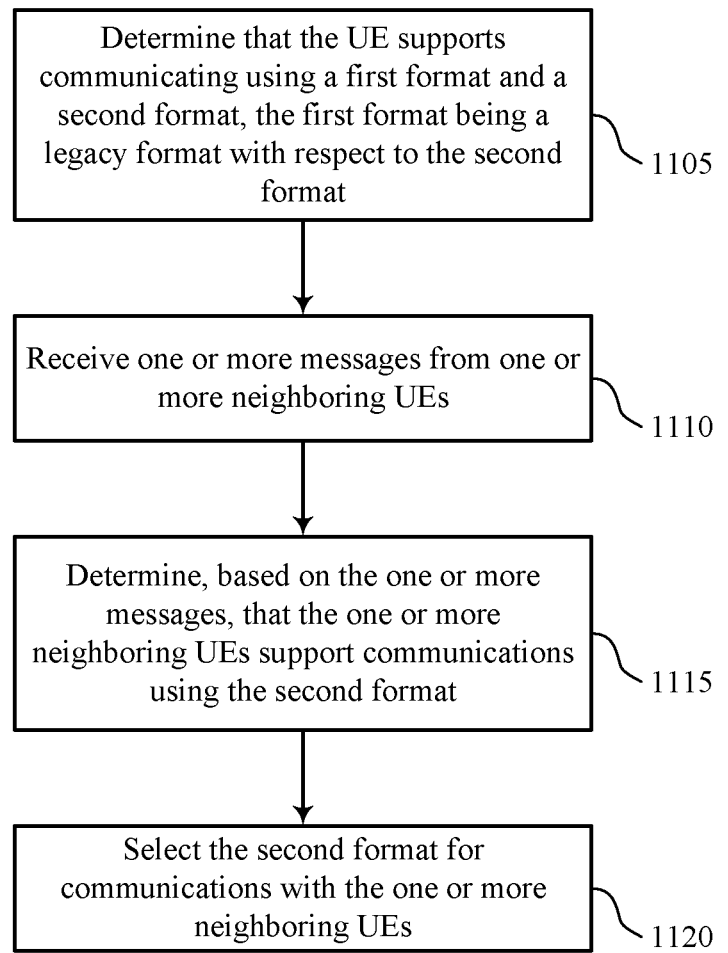

FIG. 11 shows a flowchart illustrating a method 1100 for eV2X RAT migration, in accordance with one or more aspects of the present disclosure. The operations of method 1100 may be implemented by a UE 115 or its components as described herein. For example, the operations of method 1100 may be performed by a communications manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1105 the UE 115 may determine that the UE supports communicating using a first format and a second format, the first format being a legacy format with respect to the second format. The operations of block 1105 may be performed according to the methods described herein. In certain examples, aspects of the operations of block 1105 may be performed by a parameter manager as described with reference to FIGS. 5 through 8.

At block 1110 the UE 115 may receive one or more messages from one or more neighboring UEs. The operations of block 1110 may be performed according to the methods described herein. In certain examples, aspects of the operations of block 1110 may be performed by an indication manager as described with reference to FIGS. 5 through 8.

At block 1115 the UE 115 may determine, based at least in part on the one or more messages, that the one or more neighboring UEs support communications using the second format. The operations of block 1115 may be performed according to the methods described herein. In certain examples, aspects of the operations of block 1115 may be performed by a parameter manager as described with reference to FIGS. 5 through 8.

At block 1120 the UE 115 may select the second format for communications with the one or more neighboring UEs. The operations of block 1120 may be performed according to the methods described herein. In certain examples, aspects of the operations of block 1120 may be performed by a generation manager as described with reference to FIGS. 5 through 8.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein-including, for example, wireless communication system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A non-transitory computer-readable medium storing code for wireless communications at a user equipment (UE), the code comprising instructions executable by a processor to:
   identify, at the UE that is configured to transmit a message to a neighboring UE via multiple formats, a service parameter indicative of a format to be used for the message;
   convey information indicating the service parameter from a first layer of the UE to a second layer of the UE, wherein the first layer is an upper layer with respect to the second layer; and
   generate, by the second layer and based at least in part on the information, the message in the format for communicating with the neighboring UE.

2. The non-transitory computer-readable medium of claim 1, wherein the code comprises additional instructions executable by the processor to:
   transmit the generated message to the neighboring UE according to the format.

3. The non-transitory computer-readable medium of claim 1, wherein:
   the message is associated with a service, and wherein the instructions executable by the processor to identify the service parameter comprise instructions executable by the processor to select a service identifier associated with the service.

4. The non-transitory computer-readable medium of claim 3, wherein:
   the association between the service parameter and the service identifier is configured for the UE.

5. The non-transitory computer-readable medium of claim 1, wherein the code comprises additional instructions executable by the processor to:
   classify the message based at least on the service identifier.

6. The non-transitory computer-readable medium of claim 1, wherein the code comprises additional instructions executable by the processor to:
   include in the message, and by the first layer, a flag to indicate the service parameter.

7. The non-transitory computer-readable medium of claim 6, wherein the instructions executable by the processor to include the flag comprise instructions executable by the processor to:
   determine whether to include the flag in the message based at least in part on a listing of service identifiers associated with the service parameter.

8. The non-transitory computer-readable medium of claim 1, wherein the code comprises additional instructions executable by the processor to:
   generate the message as a version of multiple versions of vehicle-to-everything (V2X) messages.

9. The non-transitory computer-readable medium of claim 1, wherein the code comprises additional instructions executable by the processor to:
   communicate a safety message associated with vehicle-based operations.

10. The non-transitory computer-readable medium of claim 1, wherein the code comprises additional instructions executable by the processor to:
    determine that the UE supports communicating using a first format and a second format, the first format being a legacy format with respect to the second format;
    receive one or more messages from the neighboring UE;
    determine, based at least in part on the one or more messages, that the neighboring UE supports communications using the second format; and
    select the second format for communications with the neighboring UE.

11. The non-transitory computer-readable medium of claim 10, wherein the code comprises additional instructions executable by the processor to:
    decode, for each received message, a scheduling assignment to determine that the neighboring UE supports communications using the second format.

12. The non-transitory computer-readable medium of claim 10, wherein the code comprises additional instructions executable by the processor to:
    decode, for each received message, a header portion of the message to determine that the neighboring UE supports communications using the second format.

13. The non-transitory computer-readable medium of claim 12, wherein:
    the header portion of the message comprises a medium access control (MAC) header portion, a radio link control (RLC) header portion, or a packet data convergence protocol (PDCP) header portion.

14. The non-transitory computer-readable medium of claim 13, wherein:
the one or more messages are associated with safety messages configured according to the first format.

15. The non-transitory computer-readable medium of claim 13, wherein:
the one or more messages comprise a service identifier, wherein the service identifier conveys an indication that the neighboring UE supports communications using the second format.

16. An apparatus for wireless communications at a user equipment (UE), comprising:
a processor,
memory coupled with the processor; and
instructions stored in the memory and executable by the processor to cause the apparatus to:
select, at the UE that is configured to transmit a message to a neighboring UE via multiple protocols, one or more parameters indicative of a radio access technology (RAT) to be used for the message;
convey information indicating the one or more parameters from a first layer of the UE to a second layer of the UE, wherein the first layer is an upper layer with respect to the second layer; and
instantiate, by the second layer and based at least in part on the one or more parameters, a channel for communications with the neighboring UE according to the RAT.

17. The apparatus of claim 16, wherein the instructions are further executable by the processor to cause the apparatus to:
identify, by the first layer, one or more of a quality of service (QoS) metric, a proximity service (ProSe) per-packet priority (PPPP), a service identifier, or an identifier associated with the layer two identifier (L2ID), associated with the communications with the neighboring UE, wherein the one or more parameters comprise one or more of the QoS metric, the PPPP, the service identifier, or the L2ID.

18. The apparatus of claim 17, wherein the instructions are further executable by the processor to cause the apparatus to:
configure, for each packet of a one or more packets, the packet to indicate one or more of the QoS metric, the PPPP, the service identifier, or the L2ID, to the second layer.

19. The apparatus of claim 17, wherein:
the QoS metric is associated with a vehicle-to-everything (V2X) QoS class identifier (VQI).

20. The apparatus of claim 17, wherein the instructions are further executable by the processor to cause the apparatus to:
configure, by the second layer and according to the one or more parameters, a virtual bearer to use for communications with the UE.

21. The apparatus of claim 20, wherein:
the virtual bearer comprises at least one of a logical bearer, or a radio bearer, or a long term evolution (LTE) vehicle-to-everything (V2X) bearer, or a set of next generation new radio (NR) bearers that are generated dynamically by the second layer based on the one or more parameters selected by the first layer, or a combination thereof.

22. The apparatus of claim 20, wherein:
the virtual bearer is configured based on a message received from the neighboring UE.

23. The apparatus of claim 22, wherein:
the receipt of the message triggers an activation of an application associated with the virtual bearer.

24. The apparatus of claim 16, wherein:
the communications according to the RAT comprises one or more of a supported broadcast traffic function, a safety message function, a scheduling assignment, a carrier aggregation, a modulation and coding scheme (MCS), or a transmission time interval.

25. The apparatus of claim 16, wherein:
the communications with the neighboring UE comprise a message associated with vehicle-based operations.

26. The apparatus of claim 16, wherein the instructions are further executable by the processor to cause the apparatus to:
access, by the first layer, a preconfigured rule, a rule received from a network entity, or combinations thereof to select the one or more parameters.

27. The apparatus of claim 16, wherein the instructions are further executable by the processor to cause the apparatus to:
instantiate a long term evolution (LTE) channel for communications with the neighboring UE by default; and
set-up a next generation new radio (NR) channel dynamically based at least in part on receipt of a message from the neighboring UE triggering the generation of the NR channel.

28. An apparatus for wireless communications at a user equipment (UE), comprising:
means for identifying, at the UE that is configured to transmit a message to a neighboring UE via multiple formats, a service parameter indicative of a format to be used for the message;
means for conveying information indicating the service parameter from a first layer of the UE to a second layer of the UE, wherein the first layer is an upper layer with respect to the second layer; and
means for generating, by the second layer and based at least in part on the information, the message in the format for communicating with the neighboring UE.

29. An apparatus for wireless communications at a user equipment (UE), comprising:
means for selecting, at the UE that is configured to transmit a message to a neighboring UE via multiple protocols, one or more parameters indicative of a radio access technology (RAT) to be used for the message;
means for conveying information indicating the one or more parameters from a first layer of the UE to a second layer of the UE, wherein the first layer is an upper layer with respect to the second layer; and
means for instantiating, by the second layer and based at least in part on the one or more parameters, a channel for communications with the neighboring UE according to the RAT.

30. A method for wireless communication, comprising:
conveying, from a first layer of a user equipment to a second layer of the user equipment, information indicating a service parameter indicative of a format to be used for a message to a neighboring user equipment, the first layer being an upper layer with respect to the second layer; and
generating, by the second layer and based at least in part on the information indicating the service parameter indicative of the format to be used for the message to the neighboring user equipment, the message in the format; and
transmitting the message to the neighboring user equipment.

31. A method for Wireless communication, comprising:
conveying, from a first layer of a user equipment to a second layer of the user equipment, information indicating one or more parameters indicative of a radio access technology (RAT) to be used for a message to a neighboring user equipment, the first layer being an upper layer with respect to the second layer; and
instantiating, by the second layer and based at least in part on the information indicating one or more parameters indicative of the RAT to be used for the message to the neighboring user equipment, a channel for communications with the neighboring user equipment according to the RAT.

* * * * *